(12) United States Patent
Yano et al.

(10) Patent No.: US 7,360,750 B2
(45) Date of Patent: Apr. 22, 2008

(54) PIEZOELECTRIC AIR VALVE AND MULTIPLE-TYPE PIEZOELECTRIC AIR VALVE

(75) Inventors: Takeshi Yano, Tokyo (JP); Toshiro Higuchi, Yokohama (JP); Kenichi Kudoh, Tokyo (JP); Sze Keat Chee, Tokyo (JP); Tsunehiko Shibata, Tokyo (JP); Norimasa Ikeda, Tokyo (JP)

(73) Assignee: Satake Corporation, Tokyo (JP)

( * ) Notice: Subject to any disclaimer, the term of this patent is extended or adjusted under 35 U.S.C. 154(b) by 0 days.

(21) Appl. No.: 10/822,126

(22) Filed: Apr. 9, 2004

(65) Prior Publication Data

US 2004/0206409 A1  Oct. 21, 2004

(30) Foreign Application Priority Data

Apr. 18, 2003 (JP) .............................. 2003-113786

(51) Int. Cl.
*F16K 31/12* (2006.01)
(52) U.S. Cl. ..................... 251/129.07; 251/129.01; 310/323.08
(58) Field of Classification Search ........... 251/129.01, 251/129.06, 129.07; 310/323.08, 323.17
See application file for complete search history.

(56) References Cited

U.S. PATENT DOCUMENTS

| | | |
|---|---|---|
| 2,504,731 A | 4/1950 | Rose et al. |
| 2,587,686 A | 3/1952 | Berry |
| 3,738,484 A | 6/1973 | Hoover et al. |
| 3,802,558 A | 4/1974 | Rhys |
| 3,990,581 A | 11/1976 | Tengsater |
| 4,088,227 A | 5/1978 | Lockett |
| 4,099,620 A | 7/1978 | Kendall et al. |
| 4,101,076 A * | 7/1978 | Bart ........................ 239/584 |
| 4,231,478 A | 11/1980 | Stone |
| 4,236,640 A | 12/1980 | Knight |
| 4,314,645 A | 2/1982 | Perkins, III et al. |
| 4,318,023 A * | 3/1982 | O'Neill et al. ............ 310/328 |
| 4,319,269 A | 3/1982 | Kajiura et al. |
| 4,520,702 A | 6/1985 | Davis et al. |
| 4,576,482 A | 3/1986 | Pryor |
| 4,581,632 A | 4/1986 | Davis et al. |
| 4,738,175 A | 4/1988 | Little et al. |
| 4,829,380 A | 5/1989 | Iadipaolo |
| 4,853,533 A | 8/1989 | Little et al. |
| 4,906,099 A | 3/1990 | Casasent |

(Continued)

FOREIGN PATENT DOCUMENTS

| | | |
|---|---|---|
| JP | 2-204213 | 8/1990 |
| JP | 09-113454 | 5/1997 |
| JP | P2001-179187 A | 7/2001 |

*Primary Examiner*—John K. Fristoe, Jr.
(74) *Attorney, Agent, or Firm*—Wells St. John, P.S.

(57) ABSTRACT

The air valve includes a valve body for controlling operations to open and close the communication between an air pressure chamber and an air outlet, a piezoelectric element for generating driving force in the form of displacements, and a displacement enlarging mechanism for enlarging the small displacements generated by the piezoelectric element by the principle of a pry and applying the enlarged displacements to the valve body. The enlarged displacements cause a large and sufficient gap to be developed between the air pressure chamber and the air outlet when a voltage is applied to the piezoelectric element. When the applying of voltage to the piezoelectric element is stopped, the resetting force of the piezoelectric element itself causes the gap to be closed quickly.

16 Claims, 9 Drawing Sheets

U.S. PATENT DOCUMENTS

| | | |
|---|---|---|
| 5,060,290 A | 10/1991 | Kelly et al. |
| 5,090,574 A | 2/1992 | Hamby |
| 5,119,205 A | 6/1992 | Lemelson |
| 5,151,822 A | 9/1992 | Hekker et al. |
| 5,197,607 A | 3/1993 | Hakansson |
| 5,283,641 A | 2/1994 | Lemelson |
| 5,318,173 A | 6/1994 | Datari |
| 5,335,293 A | 8/1994 | Vannelli et al. |
| 5,487,472 A | 1/1996 | Satake et al. |
| 5,509,537 A | 4/1996 | Crismon et al. |
| 5,526,437 A | 6/1996 | West |
| 5,628,411 A | 5/1997 | Mills et al. |
| 5,659,624 A | 8/1997 | Fazzari et al. |
| 5,881,767 A | 3/1999 | Loser |
| 6,062,532 A * | 5/2000 | Gurich et al. .................. 251/57 |
| 6,131,879 A * | 10/2000 | Kluge et al. ............ 251/129.06 |
| 6,715,731 B1 * | 4/2004 | Post et al. .............. 251/129.06 |
| 6,776,390 B1 * | 8/2004 | Boecking ................ 251/129.06 |
| 2002/0148518 A1 | 10/2002 | Lindler et al. |

\* cited by examiner

Fig. 6A
Fig. 6B
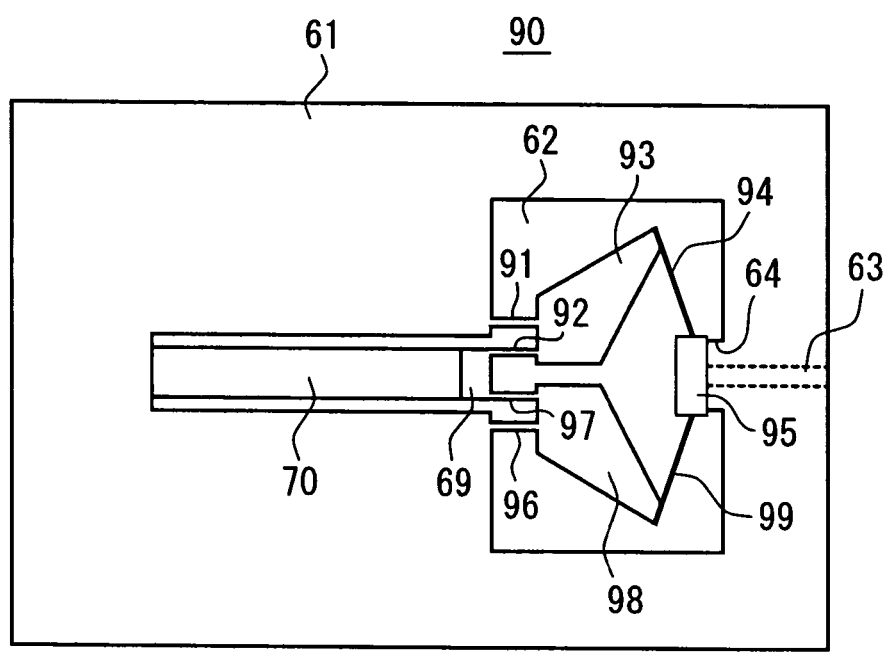
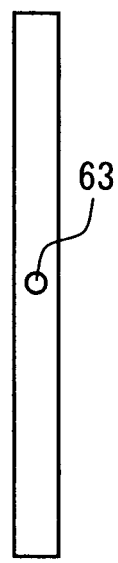

Fig. 7A
Fig. 7B
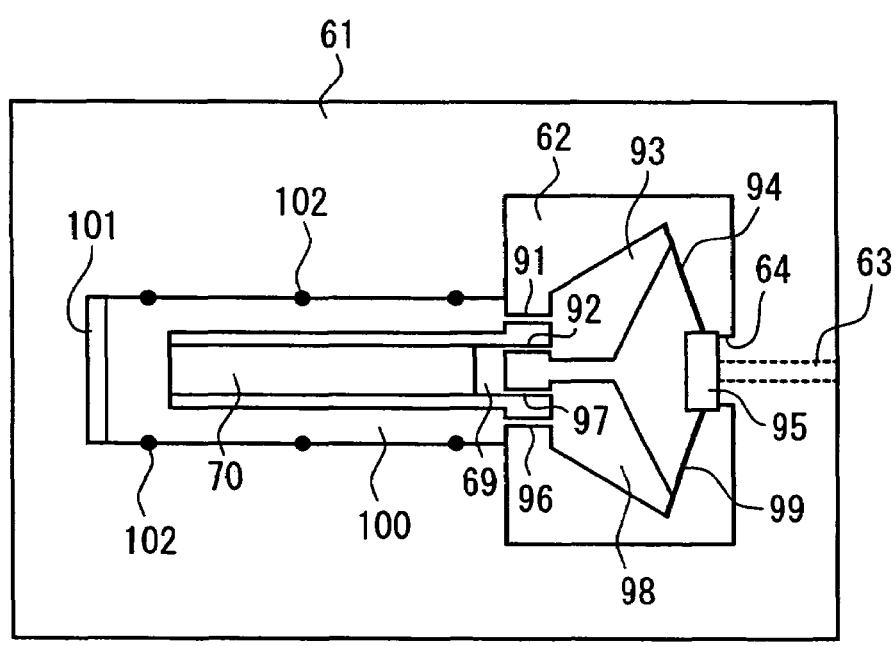
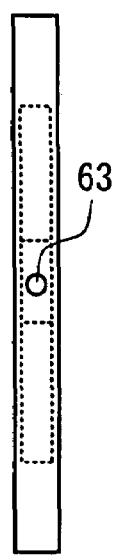

Fig. 8A
Fig. 8B
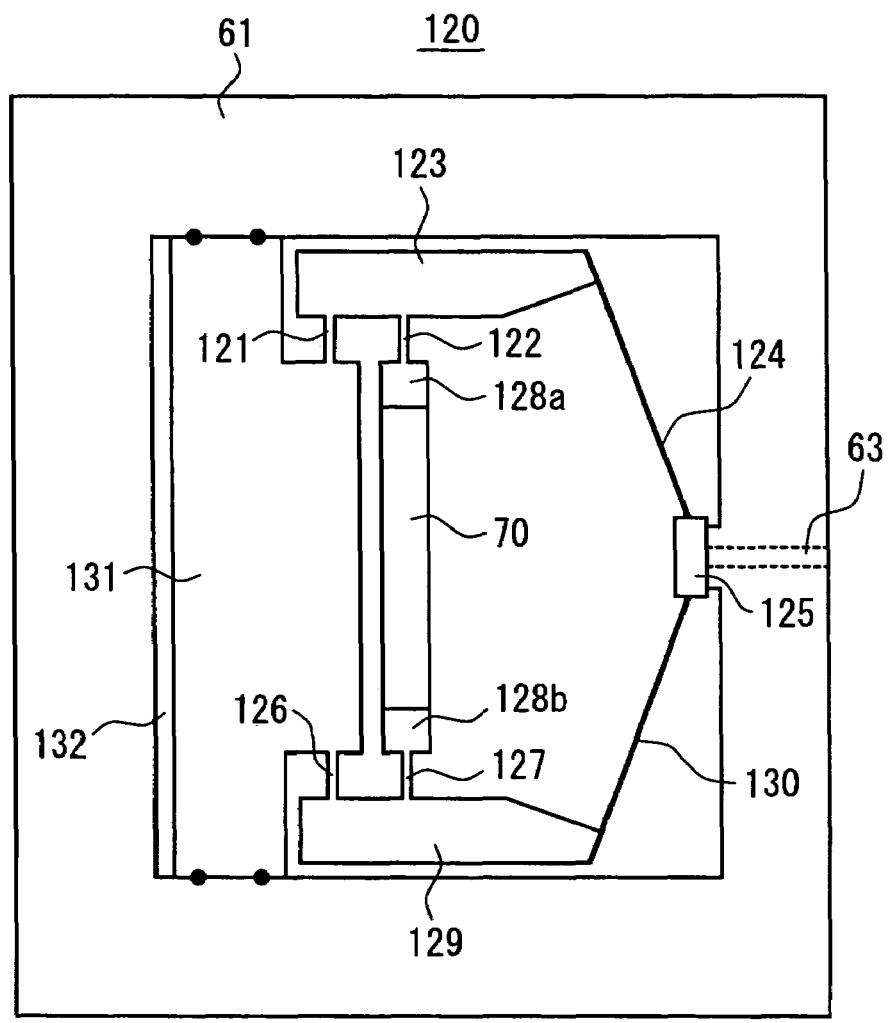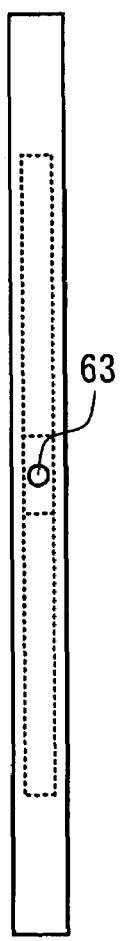

PIEZOELECTRIC AIR VALVE AND MULTIPLE-TYPE PIEZOELECTRIC AIR VALVE

RELATED APPLICATION

This application relates to and claims a priority from corresponding Japanese Patent Application No. 2003-113786 filed on Apr. 18, 2003.

BACKGROUND OF THE INVENTION

1. Field of the Invention

The present invention relates to a granular material sorting machine for sorting and removing foreign materials such as stones undesirably mixed in cereals like rice grains and defectives such as colored grains and, more specifically, to an air valve functioning as the main component which affects the sorting capability in the granular material sorting machine.

2. Description of the Related Art

In general, elimination of defectives by means of a sorting machine is carried out by contiguously releasing granular materials into air along a given falling locus and blowing away the defectives at a predetermined position outside the given falling locus with use of air pulses in accordance with a defective detection signal. It is an air valve to generate the air pulses that directly blow away the defectives in a sorting machine. In this sense, it is considered that the air valve is the main component that determines the sorting capability of a sorting machine. Though it is ideal that the sorting machine can selectively remove only the defectives from the granular materials falling down along a given falling locus in which the defectives are undesirably involved. However, in practice, the sorting machine blows way not only the defectives but also normal granular materials sometimes. This is an unfavorable phenomenon that results in, and it is noted as one of the reasons that the air valve does not have a satisfactory high-speed performance required for the selective removal. Therefore, high-speed performance of a high level is required for the air valve in order to efficiently remove only the defectives.

At present, as the air valve used for rice grain sorting machines among the sorting machines, air valves utilizing electromagnetic attraction force have been used most widely. The air valve of this type is configured such that an electromagnet is used to attract an armature having air valve function and the air valve is opened only for a period in which the electromagnet has attracted the armature. However, the air valve utilizing the electromagnetic attraction force has already reached its maximum capability and has no more allowance for the high-speed operating performance for reasons of the followings. Namely, it is required to increase the electromagnetic force in order to achieve the high-speed operation of the air valve. However, the magnetic saturation of the armature works as one of the factors for limiting the attraction force. Since there is no allowance at present for the magnetic material itself used for the armature to ease the magnetic saturation phenomenon, it is required to increase the mass of the armature in order to enhance the attraction force. However, the increase in the mass of the moving armature itself runs counter to the further high-speed operation thereof. Hence, it is noted that the operation of the air valve of the type utilizing the electromagnetic attraction force at a high speed faster than the speed having been achieved at present will be so hard to realize.

As physical means other than the electromagnetic attraction force, there is piezoelectric effect that may be used for generating force for opening the air valve. In this case, displacement to be generated when a piezoelectric material such as a ceramic material is applied with a voltage is utilized. As a concrete example of the piezoelectric element, a piezo-element may be given as the representative. The piezo-element converts electric energy to mechanical energy in a highly efficient manner and has a sufficiently high response speed. However, the quantity of the displacement to be generated by the piezo-element is at most in a range of ten and several μm to several tens μm, which is too small to be used for the air valve used in the sorting machine that performs control operations to open and close the compressed air.

An example, in which a piezoelectric element is used for an air pressure ejector (air valve) in a sorting apparatus, is disclosed in, for example, the specification of Japanese Patent Application No. H8-518436 (Japanese Patent Publication No. H10-510040). FIG. 1 is a representative drawing of the ejector, and the outline of the ejector will now be explained in the following. In this ejector, the opening and closing of a space between chambers 13, 15 into which compressed air 11 has been introduced and a valve seat 17 is performed by a superimposed member consisting of a diaphragm 21 and a piezoelectric element 23 those which are arranged transversely with respect to the valve seat 17. The superimposed member of the diaphragm 21 and the piezoelectric element 23 is arranged such that it is slightly remote from the valve seat 17 when the compressed air 11 has not been introduced into the chambers 13, 15. When the compressed air 11 is introduced into the chambers 13, 15 and the chambers 13, 15 come to be in a pressured state, a difference in the pressure, that is a differential pressure, is generated between the inlet 25 for the compressed air and the outlet 27 being in contact with the exterior air. This differential pressure elastically deforms the superimposed member consisting of the diaphragm 21 and the piezoelectric element 23 to close the valve seat 17 and causes the superimposed member to stay at that position. Under the state as described above, when current is applied selectively to the piezoelectric element 23, the superimposed member consisting of the diaphragm 21 and the piezoelectric element 23 recedes from the valve seat 17, that is, moves upward in the drawing, due to the deformation of the piezoelectric element 23 to thereby give a space between itself and the valve seat 17 so that the valve seat 17 is opened. Correspondingly thereto, the compressed air 11 inside the chambers 13, 15 is ejected as the air pulses 29 to the exterior through the valve seat 17 and the outlet 27. The air valve of this type has relatively small mass in the movable section, and therefore, it suits to the requirement of the high-speed performance. However, the force itself generated by the displacement of the piezoelectric element is little, and the air valve of this type cannot respond quickly. Hence, the air valve of this type has not been used with satisfaction for the opening/closing control of the air valve to which the high-speed response performance is intensively required. As a result, there is a problem for the air valve of this type in that it cannot give sufficient air pulses 29, especially in the response performance.

As other example in which a piezoelectric element is used in the air valve is described in the paper titled as "Air pressure on/off valve utilizing the impact force of a laminated piezoelectric element", pages 203-204, Symposium IV of the 74th National Meeting of the Japanese Machinery Society. The on/off valve disclosed in this paper is configured such that a small inertial member (a nozzle flapper valve) having been constantly supported in a biased state by a spring having weak elasticity is caused to spring up due to the impact force generated by a piezoelectric element to thereby transiently generate a gap greater than the displacement quantity of the piezoelectric element itself. However, there is such a defective in this on/off valve that it takes time for the closing operation of the flapper valve after the impact because the closing operation is effected by a spring with weak elasticity.

As still other example in which a piezoelectric element is used for the valve, there is a piezoelectric element valve of a laminated piezoelectric actuator type as disclosed in Japanese Patent Laid-open No. H8-93944. This piezoelectric element valve is a valve to be installed between the inlet side and the outlet side of a raw material gas injection equipment or the like for injecting gas into a nuclear fusion apparatus and to be used for the remote control of the gas injection. This piezoelectric element valve has a mechanism of enlarging the displacements generated by a piezoelectric element by virtue of the principle of a pry. However, it takes time with this valve for the closing operation like the valves of the prior art do since the closing operation of the valve is effected by an elastic member (a spring) for resetting unlike the piezoelectric element. On the other hand, it is not problematic so much to take time for the closing operation in case of the piezoelectric element valve, because the piezoelectric element valve is not for generating the air pulses to which excellent high-speed performance is required for both opening and closing operations, but is simply a valve for controlling the gas passage.

The air valve according to the present invention uses the above-described piezoelectric element as will be described later, in which a special additional mechanism is provided to solve such disadvantages of the valves using a piezoelectric element of the prior arts that the gap to be produced is small and the closing operation is slow.

Although it is neither an electromagnetic air valve nor a piezoelectric air valve, the other example of the prior art for the elimination device of a sorting machine is disclosed in the specification of Japanese Patent Application No. 2000-182203 (Japanese Patent Laid-open No. 2002-01232). In this device, a slope surface to be contact with granules is formed in a unified state at the distal end portion of a movable access shaft in a so-called solenoid-type driving means, and it is configured such that the driving means is selectively operated to directly and mechanically eliminate the defective grains. Although there could be problematic in the response performance and the abrasion property if the movable access shaft of a sliding type is formed, this elimination device has such a special structure that it uses the bounce of a permanent magnet to float the movable access shaft to thereby support the movable access shaft without sliding. Since the movable access shaft is structured to be supported without sliding, no load such as the sliding friction applied to the movable access shaft at the time of access is produced. As a result, high-speed response performance equivalent to that of the air pulse type can be attained. In addition, it is an additional advantage for this device that a compressed air source is not required as the component. However, since the permanent magnet is structurally required for floating the movable access shaft to support it, the size of the elimination device alone becomes large to a given extent. Accordingly, for example, in case of a sorting machine of multi-channel system, it is required to make some modifications for the sorting machine such as arranging the adjacent elimination devices in zigzag patterns, and so on.

SUMMARY OF THE INVENTION

In view of the above-described problems of the prior arts, it is an object of the present invention to provide an air valve using a piezoelectric element to be used for a sorting machine, with which air pulses with sufficient ejecting amounts can be stably produced.

It is another object of the present invention to provide an air valve to be used for a sorting machine, which can use the high-speed response performance exerted by a piezoelectric element at the maximum level to operate both the opening and closing operations at high speeds.

It is still another object of the present invention to provide an air valve to be used for a sorting machine, which includes a compact piezoelectric element and can convert electric energy to mechanical energy with very high conversion efficiency, and with such characteristics, is suitable for the miniaturization of the whole apparatus and the use with low power consumption not only in sorting machines of the single channel type but also sorting machines of the multi-channel type.

According to the first aspect of the present invention, it is provided with a piezoelectric air valve to be used for a granular material sorting machine comprising:
 an air valve main body including air pressure chambers for receiving compressed air fed from an air pressure feeding means and an air outlet extending from the air pressure chambers to the exterior;
 a valve body for controlling operations to open and close a space between the air pressure chambers and the air outlet;
 a piezoelectric element for generating driving force in the form of displacements required for the opening and closing operations of the valve body; and
 a displacement enlarging mechanism for enlarging the displacements generated by the piezoelectric element and then apply the enlarged displacement to the valve body,
 wherein the valve body, the displacement enlarging mechanism and the piezoelectric element are mechanically connected to one another, and on one hand, the opening operation to open the valve body is performed in accordance with the enlarged displacements that are produced by enlarging the displacement generated by the piezoelectric element by the displacement enlarging mechanism when a voltage is applied to the piezoelectric element and, on the other hand, the closing operation to close the valve body is performed in accordance with the resetting force of the piezoelectric element when the applying of the voltage to the piezoelectric element is stopped.

It is preferable to install two sets of the displacement enlarging mechanisms at symmetrical positions when they are viewed from the air outlet side so that the displacements generated by the piezoelectric element are transmitted evenly to the valve body via the displacement enlarging mechanisms.

According to the second aspect of the present invention, it is provided with a multiple-type piezoelectric air valve formed by a plurality of a unit piezoelectric air valve comprising:
 an air valve main body including air pressure chambers for receiving compressed air fed from an air pressure feeding means and an air outlet extending from the air pressure chambers to the exterior;

a valve body for controlling operations to open and close a space between the air pressure chambers and the air outlet;

a piezoelectric element for generating driving force in the form of displacements required for the opening and closing operations of the valve body; and a displacement enlarging mechanism for enlarging the displacements generated by the piezoelectric element and then applying the enlarged displacement to the valve body, wherein a plurality of air pressure chambers are connected transversely so that they become a common chamber, and each one side of two single piezoelectric air valves locating at the outermost positions are closed with side plates.

BRIEF DESCRIPTION OF THE DRAWINGS

The above and other objects, features and advantages of the present invention will be apparent from the following description of preferred embodiments of the invention explained with reference to the accompanying drawings, in which:

FIGS. 6A and 6B are schematic views of a piezoelectric air valve of a third example according to the present invention;

FIGS. 7A and 7B are schematic views of the piezoelectric air valve of the third example shown in FIGS. 6A and 6B, a part of which is modified;

FIGS. 8A and 8B are schematic views of a piezoelectric air valve of a fourth example according to the present invention.

PREFERRED EMBODIMENTS OF THE INVENTION

Now, the piezoelectric air valve and the multiple-type piezoelectric air valve according to the present invention will be described in detail in the following with reference to the appended drawings.

Figure 1:
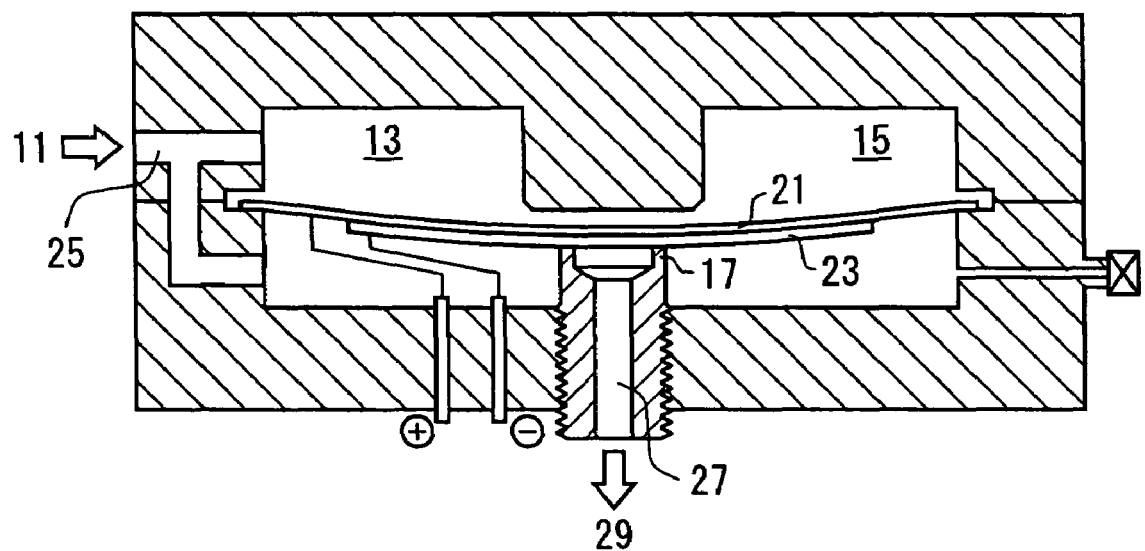
FIG. 1 is a cross-sectional view of an air valve according to the prior art using a piezoelectric element.
Figure 2:
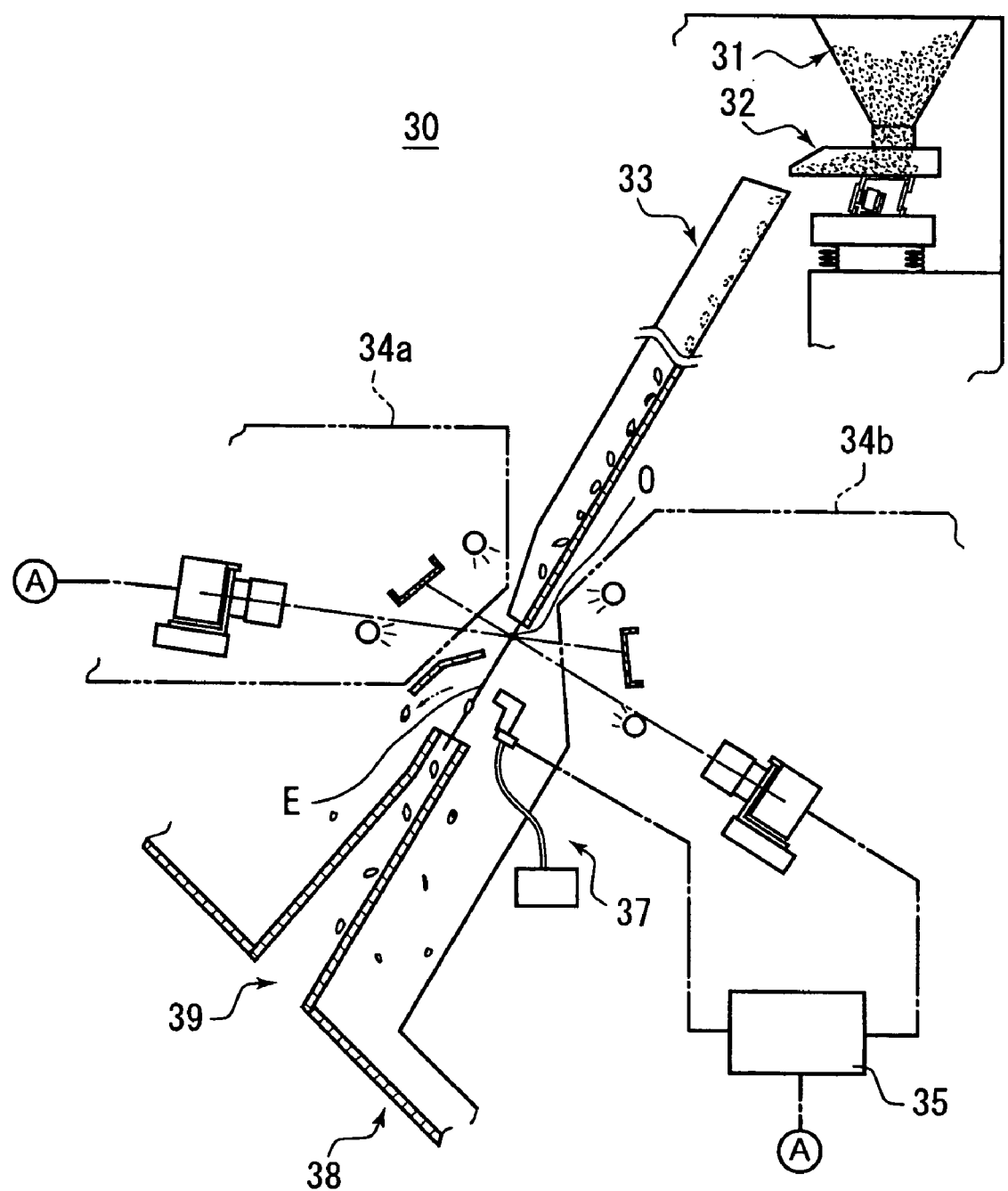
FIG. 2 is a transverse cross section of the major portion of a granular material sorting machine that can use the piezoelectric air valve according to the present invention.

In the first place, the outline of a granular material sorting machine that can use the piezoelectric air valve according to the present invention will be explained with reference to FIG. 2 in order to help understanding of the present invention. FIG. 2 is a schematic cross-sectional side view of the main portion of the granular material sorting machine 30 and the internal structure thereof. The granular material sorting machine 30 includes on its upper portion a granular material feeding section comprising a tank 31 and a vibrating feeder 32. The granular materials fed from the granular material feeding section naturally flow down in series through an inclined chute 33 and then released into air from its lower end portion along a given falling locus.

In the surrounding of the said given falling locus, at least a pair of optical detection devices 34a, 34b are arranged substantially symmetrically with respect to the falling locus. Each of the pair of optical detection devices comprises a photosensor, a lamp and a background plate. However, the details of these elements are not explained here because the configuration and operation of these elements are out of the subject matter of this invention and are well known by persons who have skills in the art. The optical detection devices 34a, 34b check every grain of the granular materials having reached the detection point O on the falling locus. Specifically, the optical detection devices 34a, 34b transmit quantities of reflected light and/or transmitted light from the granular materials locating on the detection point O in the form of electric signals to a controller 35. The controller 35 compares the signal level of every grain of the granular materials fed from the optical detection devices 34a, 34b with a predetermined value and determines the granular materials falling within the allowable range of values as the normal granular materials. On the other hand, the granular materials found to be out of the allowable range of values are determined as the defectives, and an elimination signal is transmitted from the controller 35 to, for example, an elimination device 37 that includes therein the air valve according to this invention. When the air valve is used, the elimination device 37 blows away only the defectives from a given falling locus at a given elimination point E with use of air pulses to evacuate the defectives to the outside of the sorting machine through a defective elimination outlet 38. When the above-described solenoid-type driving means is used instead of the air valve, the defectives are mechanically and directly eliminated from the falling locus and are evacuated to the outside of the sorting machine through a defective elimination outlet 38. Note that the elimination signal is formed into a delayed signal that takes the period of time required by the granular materials for falling over the distance between the detection point 0 and the elimination point E into consideration. The normal granular materials having passed through the falling locus without the activation of the elimination device 37 are recovered through a non-defective collection outlet 39. The representative example of the granular materials described here may be cereal grains, in particular rice grains. However, the granular materials are not limited to cereal grains, and any granular materials may be the objective as far as they have sizes and masses that can be blown away by the air pulses.

Now, the piezoelectric air valve and the multiple-type piezoelectric air valve according to this invention, those which can be used very conveniently as the main component of the elimination device to be included in a sorting machine as described above, will be described in detail.

As will be described later, the piezoelectric air valve according to this invention may be carried out in various embodiments. However, the piezoelectric air valve includes, as the common components for the respective embodiments, an air valve main body including an air pressure chamber for receiving compressed air fed from an air pressure feeding means, an air outlet extending from the air pressure chamber to the exterior of the valve main body, a valve body for controlling operations to open and close a space between the air pressure chamber and the air outlet, a piezoelectric element for generating driving force required for the operations to open and close the valve body, and a displacement enlarging mechanism for enlarging the quantity of displacement of the piezoelectric element. The displacement enlarging mechanism works to enlarge the small displacement quantity generated by the piezoelectric element by employing the principle of a pry. By virtue of the displacement enlarging mechanism, it is made possible to solve the defective of the air valve that uses a piezoelectric element of the prior art, that is, the small gap formed between the air outlet and the valve body that derives from such a feature of the piezoelectric element itself that it can generate only a minor displacement quantity. In the air valve according to this invention, it is very important that, among the components described above, the piezoelectric element, the displacement enlarging mechanism and the valve body are configured such that all of them are connected to one another. With the configuration as described above, a gap with a sufficient dimension may be formed between the air outlet and the valve body by virtue of the displacement enlarging mechanism under the state of applying a voltage to the piezoelectric element and, on the other hand, when the voltage having been applied to the piezoelectric element is stopped, the displacement generated by the piezoelectric element is reset to the original state of zero, the resetting force is forcibly transmitted to the valve body through the displacement enlarging mechanism, and the valve body contacts the valve seat portion at the air outlet to thereby completely intercept the connection between the air pressure chamber and the air outlet. Since the generation and reset of the displacement associated with the applying of voltage to the piezoelectric element and the stoppage thereof is so fast, the response speed of the air valve configured as described above is also fast. Accordingly, an air valve capable of performing high-speed operations may be realized with this configuration.

Now, the concrete examples commonly having the above-described configuration will be explained respectively with reference to FIGS. 3A, 3B to 9.

Figure 3A:
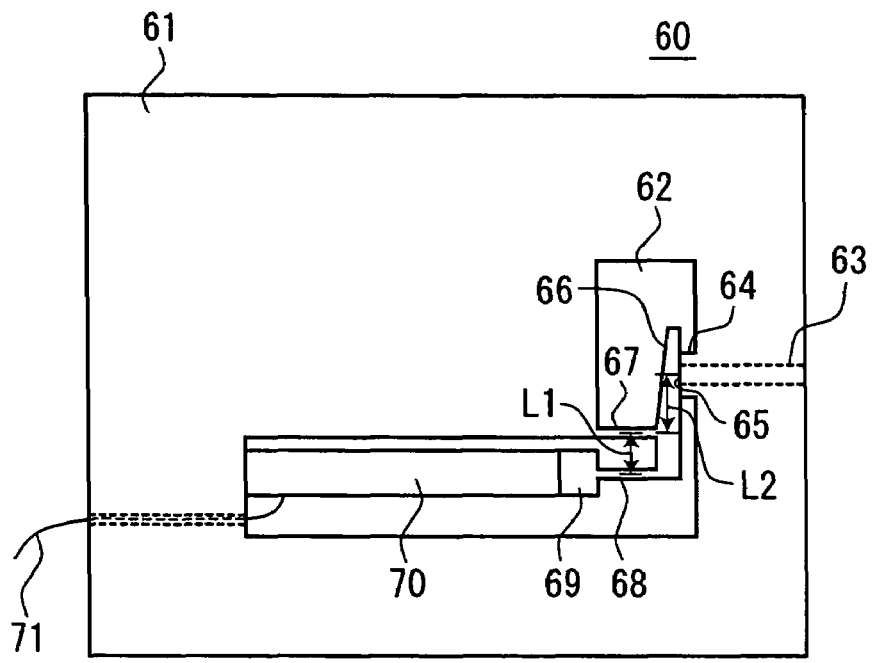
FIGS. 3A and 3B are schematic views of a piezoelectric air valve of a first example according to the present invention.
Figure 3B:
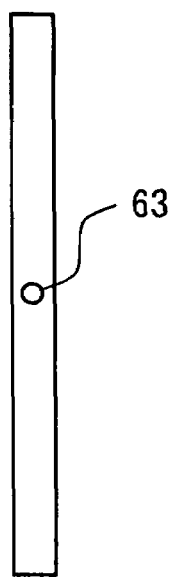

FIGS. 3A and 3B show a piezoelectric air valve 60 of the first embodiment according to this invention. FIG. 3A is a side view of the piezoelectric air valve, and FIG. 3B is a front view when it is viewed from the air outlet side. In the air valve main body 61, a compressed air chamber 62 that receives compressed air fed from an external air pressure supply source (not shown) is defined. At one part of the air valve main body 61, an air outlet 63 extending from the compressed air chamber 62 to the exterior of the main body 61 is provided. On the portion of the air valve main body 61 to which the air outlet 63 is provided, a valve seat 64 that slightly protrudes in the direction toward the compressed air chamber 62 is included. An arm member 66 having a valve body 65 on its tip end is provided such that it contacts the valve seat 64. On the opposite side to the side of the arm member 66 where the valve body 65 is provided, a first hinge 67 and a second hinge 68, those which are substantially in parallel, are provided, and each one end thereof is jointed to the arm member 66 in a unified state. The other end of the first hinge 67 is jointed to the air valve main body 61, and the other end of the second hinge 68 is jointed to one end of the piezoelectric element 70 via a cap member 69. A lead line 71 of the piezoelectric element 70 is extended to the exterior through an opening formed at an appropriate portion of the air valve main body 61 (the same as the following examples). The first and second hinges 67, 68 are made of a material that is deformable such as bending and has proper spreading property, such as stainless steel and Invar material. The other end of the piezoelectric element 70 is fixed to the air valve main body 61 by means of welding, adhesion or the like. In the example shown in the drawing, the valve body 65 is configured such that it is unified with the arm member 66. Since this unified part repeatedly impacts against the valve seat 64, it is preferable to form this part with a material which is resistant to abrasion due to the impacts. For this reason, it may be preferable sometimes to form the valve body 65 with a material different from that of the arm member 66 or to form the valve body separately from the arm member 66. In the example shown in the drawing, when the air valve is viewed from the side, the compressed air chamber 62 is shown such that the part thereof is opened. This is because the air valve is configured on the basis of the premise that a plurality of unit air valves 60 configured as described above are transversely piled so that they can be used as a multiple-type air valve for multi-channels is shown in the drawing. When a plurality of air valves are transversely piled and used, the respective compressed air chambers are connected to one another to form a large compressed air chamber as a whole. In fact, each of the one sides of the outermost air valves 60 is closed with a plate-like member. It is needless to say that, when the air valve is used as a unit air valve but not as a multiple-type air valve, the both sides shown in the drawing may be closed with plate-like members (side plates). This is the same as the following examples.

Figure 4:
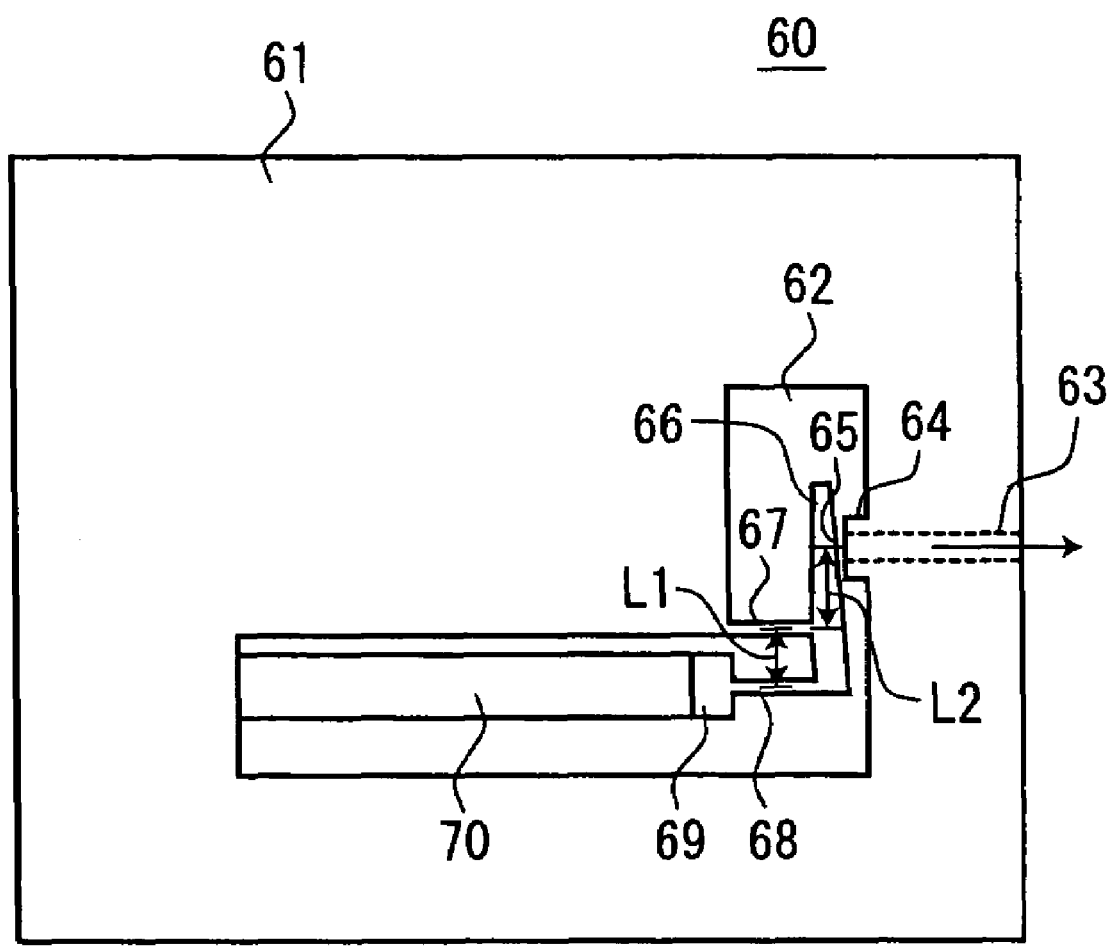
FIG. 4 is a view showing a state when a voltage is applied to the piezoelectric element of the piezoelectric air valve shown in FIGS. 3A and 3B.

Then, the operation of the first example configured as described above will be described with reference to FIG. 4. FIG. 3A shows the state in which no voltage is applied to the piezoelectric element 70, that is, the state in which the valve body 65 has closed the valve seat 64. Unlike FIG. 3A, FIG. 4 shows the state in which a voltage is applied to the piezoelectric element 70, that is, the state in which the piezoelectric element 70 is extended, the valve body 65 responds to the extension of the piezoelectric element to separate from the valve seat 64, and a gap is produced there. During a period of applying a voltage to the piezoelectric element 70, the air in the compressed air chamber 62 is evacuated as the air pulses to the exterior through the gap and then the air outlet 63. Since the piezoelectric element 70 itself is of the prior art, the elongation thereof when it is applied with a voltage is in a range of at most 10 and several μm to several tens μm in the length. It is not sufficient if the gap between the valve body 65 and the valve seat 64 is formed only with the elongation of that extent. However, since the displacement enlarging mechanism comprising the first hinge 67, the second hinge 68 and the arm member 66 is provided in the present invention, it is possible to produce a large or sufficient gap between the valve body 65 and the valve seat 64, that is capable of evacuating a sufficient volume of compressed air through the air outlet 63. Specifically, when the distance between the second hinge 68, that is the point of force, and the first hinge 67, that is the fulcrum, is given as L1, and the distance between the first hinge 67 and the center of the valve body 65, that is the point of action, is given as L2, the elongation of the piezoelectric element 70 is enlarged L2/L1 times in the central part of the valve body 65 by virtue of the principle of a pry, which makes feasible to produce the gap with a sufficient dimension between the valve body 65 and the valve seat 64. When the applying of a voltage to the piezoelectric element 70 is stopped, the piezoelectric element 70 is reset to the original state. Since the arm member 66 including the piezoelectric element 70, the cap member 69, the second hinge 68 and the valve body 65 in a unified state has a structure in which all components are connected to one another, the resetting force of the piezoelectric element 70 is forcibly transmitted as it is to the valve body 65 and acts as a forcible force so as to push or urge the valve body 65 against the valve seat 64. Once the valve 65 contacts the valve seat 64, the valve body 65 is held in a close adherence state by the valve seat 64 by virtue of the differential pressure between high pressure inside the compressed air chamber 62 and the external air pressure in the air outlet 63.

Figures 5A, 5B:
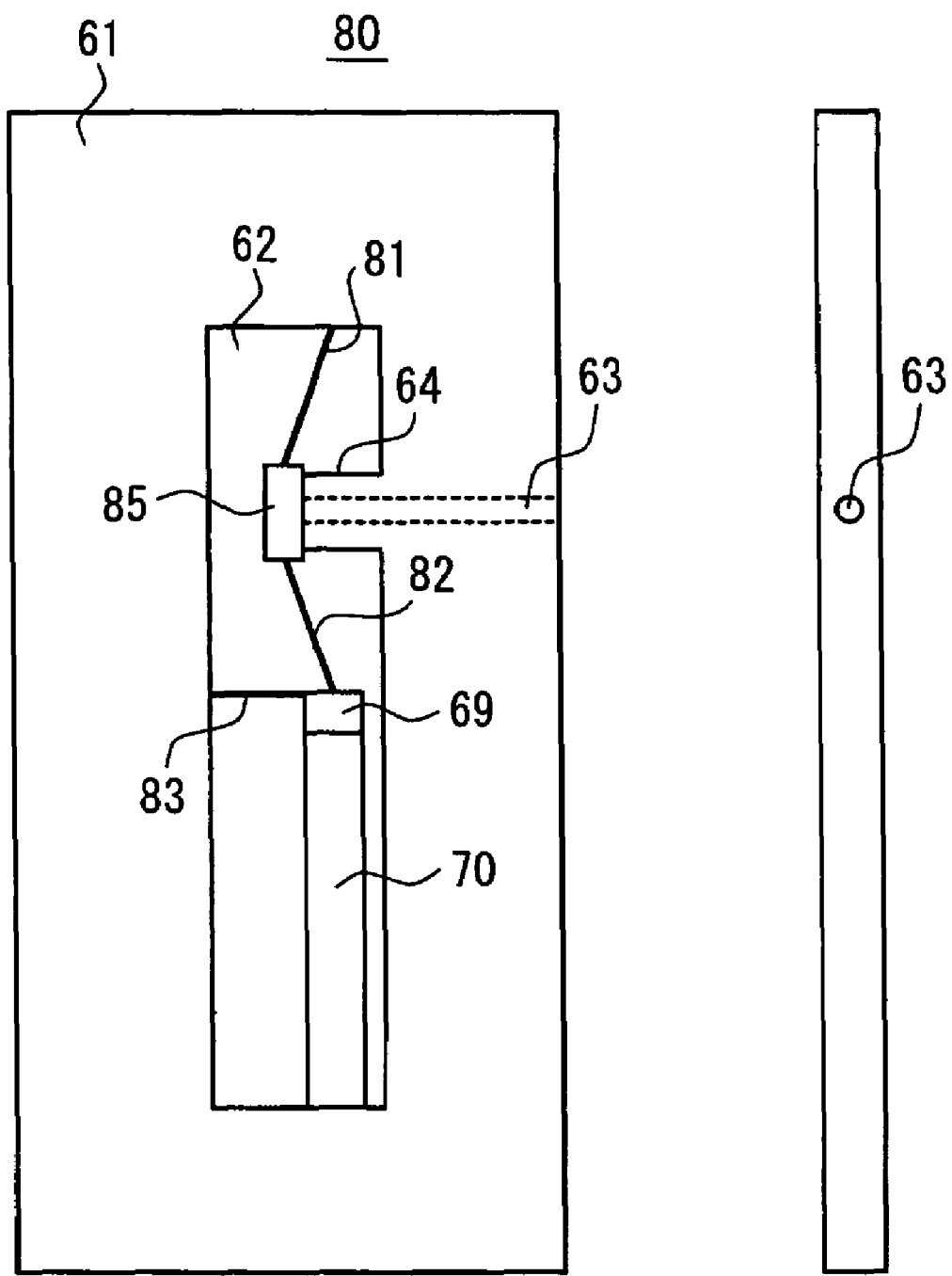
FIGS. 5A and 5B are schematic views of a piezoelectric air valve of a second example according to the present invention.

FIGS. 5A and 5B show a piezoelectric air valve of the second example according to this invention. FIG. 5A is a side view of the piezoelectric air valve 80, and FIG. 5B is a front view thereof. To the components of the piezoelectric air valves of the following examples including this second example those which are same or equivalent to those of the first example, the same reference numerals are given, and the explanation for them will be omitted. In the second example, the valve body 85 is supported by a first flat or plate spring 81 and a second flat spring 82. One end of the first flat spring 81 is jointed to the air valve main body 61, and the other end thereof is jointed to the valve body 85. One end of the second flat spring 82 is jointed to the cap member 69, and the other end thereof is jointed to the valve body 85. The first and second flat springs 81 and 82 are set as if they are inclined symmetrically from the air outlet 63 supposed to be the center so that force to push the jointed valve body 85 against the valve seat 64 is exerted, when no voltage is applied to the piezoelectric element 70. In this example, the protrusion degree of the part of the valve seat 64 is larger than that of the first example, which is also associated with the setting of the flat springs 81, 82 in the inclined state. One end of a third flat spring 83 is jointed to the air valve main body 61 and the other end thereof is jointed to the cap member 69. The third flat spring 83 is set to antagonize force that biases the piezoelectric element 70 toward the upper right direction in the drawing. This force is generated in association with the inclined state of the second flat spring 82 when the piezoelectric element 70 is applied with a voltage and is then elongated.

In the configuration as described above, FIG. 5A shows the state in which no voltage is applied to the piezoelectric element 70. When a voltage is applied to the piezoelectric element 70, the piezoelectric element 70 is elongated upwardly in the longitudinal direction. Accompanying with this elongation, the first flat spring 81, the second flat spring 82 and the third flat spring 83 are caused to bend. In response to the bending of these flat springs, a gap with a sufficient dimension is produced between the valve body 85 and the valve seat 64, and the compressed air in the compressed air chamber 62 is evacuated to the exterior through the air outlet 63. In this example, the first flat spring 81, the second flat spring 82 and the third flat spring 83 constitute the displacement enlarging mechanism. Since all of the first flat spring 81, the valve body 85, the second flat spring 82 and the third flat spring 83 are connected via the cap member 69, the resetting force of the piezoelectric element 70, that is generated concurrently when the applying of a voltage to the piezoelectric element 70 is stopped, is forcibly transmitted to the valve body 85 and operates so as to push the valve body 85 against the valve seat 64. After the time point once the valve body 85 contacts the valve seat 64, the valve body 85 is held in a close adherence state by the valve seat 64 by virtue of the differential pressure. This is same as the case of the first example.

FIGS. 6A and 6B show a piezoelectric air valve 90 of a third example according to this invention. FIG. 6A is a side view of the piezoelectric air valve, and FIG. 6B is a front view thereof. In this example, two displacement enlarging mechanisms are provided symmetrically in the upper and lower positions with respect to a central line connecting the piezoelectric element 70 and the air outlet 63 in the drawing. Since all components are arranged symmetrically with respect to the air outlet, the force acting to the valve body is counterbalanced in the upper and lower directions all the time. As a result, it is advantageous, particularly in the closed state, that the close adherence between the valve body and the valve seat is enhanced. The upper displacement enlarging mechanism comprises a first hinge 91, a second hinge 92, a first arm member 93 and a first flat spring 94. One end of the first hinge 91 is jointed to the air valve main body 61. One end of the second hinge 92 is jointed to the cap member 69. The respective other ends of the first and second hinges 91, 92 are jointed to the base section of the first arm member 93. The first arm member 93 extends from the base section toward the external direction (right on the bias in the drawing), and one end of the first flat spring 94 provided with proper elasticity, plasticity and flexibility that firmly urges the valve body 95 to the valve seat 64 in cooperation with a second spring 99 described later is jointed to substantially the tip of the first arm member 93. The other end of the first flat spring 94 is jointed to one end of the valve body 95. The lower displacement enlarging mechanism comprises a third hinge 96, a fourth hinge 97, a second arm member 98 and the second flat spring 99. One end of the third hinge 96 is jointed to the air valve main body 61. One end of the fourth hinge 97 is jointed to the cap member 69. The respective other ends of the third and fourth hinges 96, 97 are jointed to the base section of the second arm member 98. The second arm member 98 extends from the base section toward the lower direction (downward on the bias in the drawing), and one end of the second flat spring 99 is jointed to substantially the tip of the second arm member 98. The other end of the second flat spring 99 is jointed to the other end of the valve body 95. As described above, the air valve of this example is configured such that the valve body 95 is supported by the two displacement enlarging mechanisms arranged symmetrically in the upper and lower positions. As a material for making both of the first flat spring 94 and the second flat spring 99 for directly supporting the valve body 95, Mulage steel is preferably used.

In the configuration described above, the drawing shows the state where no voltage is applied to the piezoelectric element 70. When a voltage is applied to the piezoelectric element 70, the element 70 is elongated in the upper right direction in the drawing. In association with this elongation, the second hinge 92 acts as the point of power, the first hinge 91 acts as the fulcrum, and the tip of the first arm member 93 acts as the point of action in the upper displacement enlarging mechanism. Then, the displacement quantity of the piezoelectric element 70 having been enlarged by virtue of the principle of a pry appears on the tip portion of the first arm member 93. Similarly, the fourth hinge 94 acts as the point of power, the third hinge 96 acts as the fulcrum, and the tip portion of the second arm member 98 acts as the point of action in the lower displacement enlarging mechanism. Then, the displacement quantity of the piezoelectric element 70 having been enlarged appears on the tip portion of the second arm member 98. The displacement of the piezoelectric element 70 enlarged in the direction where the distance between the first arm member 93 and the second arm member 98 is sundered and having appeared on the respective tip portions of the first and second arm members 93, 98 sunder the valve body 95 a sufficient distance from the valve seat 64 via the first flat spring 94 and the second flat spring 99 and operates so as to produce a gap with a large dimension there. As a result, a sufficient volume of compressed air is evacuated from the compressed air chamber 62 to the exterior through the air outlet 63. When the applying of a voltage to the piezoelectric element 70 is stopped, the resetting force of the piezoelectric element 70 is forcibly transmitted to the valve body 95 through the upper and lower displacement enlarging mechanisms. In response to the transmission of the resetting force, the valve body 95 is seated onto the valve seat 64. At this time, in this example, the resetting forces of the first flat spring 94 and the second flat spring 99 as their spring forces effectively act to the valve body 95 to cause the valve body 95 to be firmly seated onto the valve seat 64.

FIGS. 7A and 7B show the variation of the above-described third example. FIG. 7A is a side view of the variation, and FIG. 7B is a front view thereof. Unlike the above third example wherein the third hinge 96 and the piezoelectric element 70 are directly jointed to the air valve main body 61 by means of welding, adhesion or the like, these members are jointed to a base plate 100 that is separated from the air valve 61 in this variation example. In the case where the air valve is configured as described hereinabove, it is made possible to unify the section that includes the displacement enlarging mechanism, the valve body and the piezoelectric element to thereby facilitate the assembly and maintenance operations of the air valve. Specifically, the unified part is incorporated into the unit installation region 101 that is formed in advance inside the air valve main unit 61, and the unified part is then fixed by means of appropriate fixing means 102, following to adjusting the position of the unified part in the upper right or upper left direction in the drawing, (concretely, under such a state that a proper force has been applied in the upper right direction in the drawing) so that the proper close adherence between the valve body 95 and the valve seat 64 is attained under the state where no voltage is applied to the piezoelectric element 70. Consequently, it can be said that the fixing means 102 also function as a means for adjusting the pressure to push the valve body 95 against the valve seat 64. Since the operations of the piezoelectric element 70 under both the states of being applied with a voltage and with no voltage are fully the same as those of the third example, an explanation for the operations is omitted here.

FIGS. 8A and 8B show a piezoelectric air valve 120 of a fourth example according to this invention. FIG. 8A is a side view of the piezoelectric air valve, and FIG. 8B is a front view thereof. In this example, as well as the third example, two displacement enlarging mechanisms are provided symmetrically with respect to the air outlet 63 in the upper and lower positions in the drawing. In this example, the piezoelectric element 70 is set such that the longitudinal direction thereof is positioned to be orthogonal to the axial direction of the air outlet 63. As a result, it is made possible to shorten the depth of the air valve than the depth in the third example. The upper displacement enlarging mechanism comprises a first hinge 121, a second hinge 122, a first arm member 123 and a first flat spring 124. One end of the first hinge 121 is jointed to a base plate 131, and one end of the second hinge 122 is jointed to a first cap member 128a. The respective other ends of the first and second hinges 121, 122 are jointed to the base section of the first arm member 123. The first arm member 123 extends from the base section to the rightward transverse direction, and the tip portion thereof is jointed to one end of the first flat spring 124. The other end of the first flat spring 124 is jointed to one end of the valve body 125. The lower displacement enlarging mechanism comprises a third hinge 126, a fourth hinge 127, a second arm member 129 and a second flat spring 130. One end of the third hinge 126 is jointed to the base plate 131. One end of the fourth hinge 127 is jointed to a second cap member 128b. The respective other ends of the third and fourth hinges 126, 127 are jointed to the base section of the second arm member 129. The second arm member 129 extends from the base section toward the rightward transverse direction, and one end of the second flat spring 130 is jointed to the tip portion of the second arm member 129. One end of the first flat spring 124 and one end of the second flat spring 130 are jointed to the first arm member 123 and the second arm member 129, respectively, such that they form isosceles sides of an isosceles triangle, and the respective other ends thereof are jointed to the valve body 125. Unlike the above explained other examples, wherein one end of the piezoelectric element 70 is fixed to the air valve main body or the base plate, the piezoelectric element 70 in this example is set to be supported between the cap members 128a, 128b provided to both the ends of the piezoelectric element, respectively. Note that, though the example shown in FIGS. 8A and 8B is configured such that the piezoelectric element, the displacement enlarging mechanism and the valve body are unified with the base plate 131 like the configuration of the variation of the third example, it may be configured differently such that the first hinge 121 and the third hinge 126 are directly jointed to the air valve main body 61 by means of welding, adhesion or the like. In the drawing, the reference numeral 132 denotes the unit installation region.

In the configuration as described above, the drawing shows the state in which no voltage is applied to the piezoelectric element 70. When a voltage is applied to the piezoelectric element 70, the element 70 elongates in the upper and lower directions in the drawing. In response to the elongation, the first hinge 121 acts as the fulcrum, the second hinge 122 acts as the point of power, and the tip portion of the first arm member 123 acts as the point of action, in the upper displacement enlarging mechanism. As a consequence, the displacement quantity of the piezoelectric element 70 is enlarged by virtue of the principle of a pry and then appears on the tip portion of the first arm member 123. Similarly, in the lower displacement enlarging mechanism, the third hinge 126 acts as the fulcrum, the fourth hinge 127 acts as the point of power, and the tip portion of the second arm member 129 acts as the point of action. As a consequence, the displacement quantity of the piezoelectric element 70 is enlarged and then appears on the tip portion of the second arm member 129. The displacements of the piezoelectric element 70 having been enlarged in such a direction that the distance between the first arm member 123 and the second arm member 129 is sundered and having appeared on the respective tip portions of the first and second arm members 123, 129 sunder the valve body 125 a sufficient distance from the valve seat 64 via the first flat spring 124 and the second flat spring 130 and acts so as to produce a gap with a large dimension there. As a result, a sufficient volume of compressed air is evacuated from the compressed air chamber 62 to the exterior through the air outlet 63. When the voltage applying to the piezoelectric element 70 is stopped, like the examples as described above, the valve body 95 is forcibly seated onto the valve seat 64 via the upper and lower displacement enlarging mechanisms by virtue of the resetting force of the piezoelectric element 70.

Figure 9:
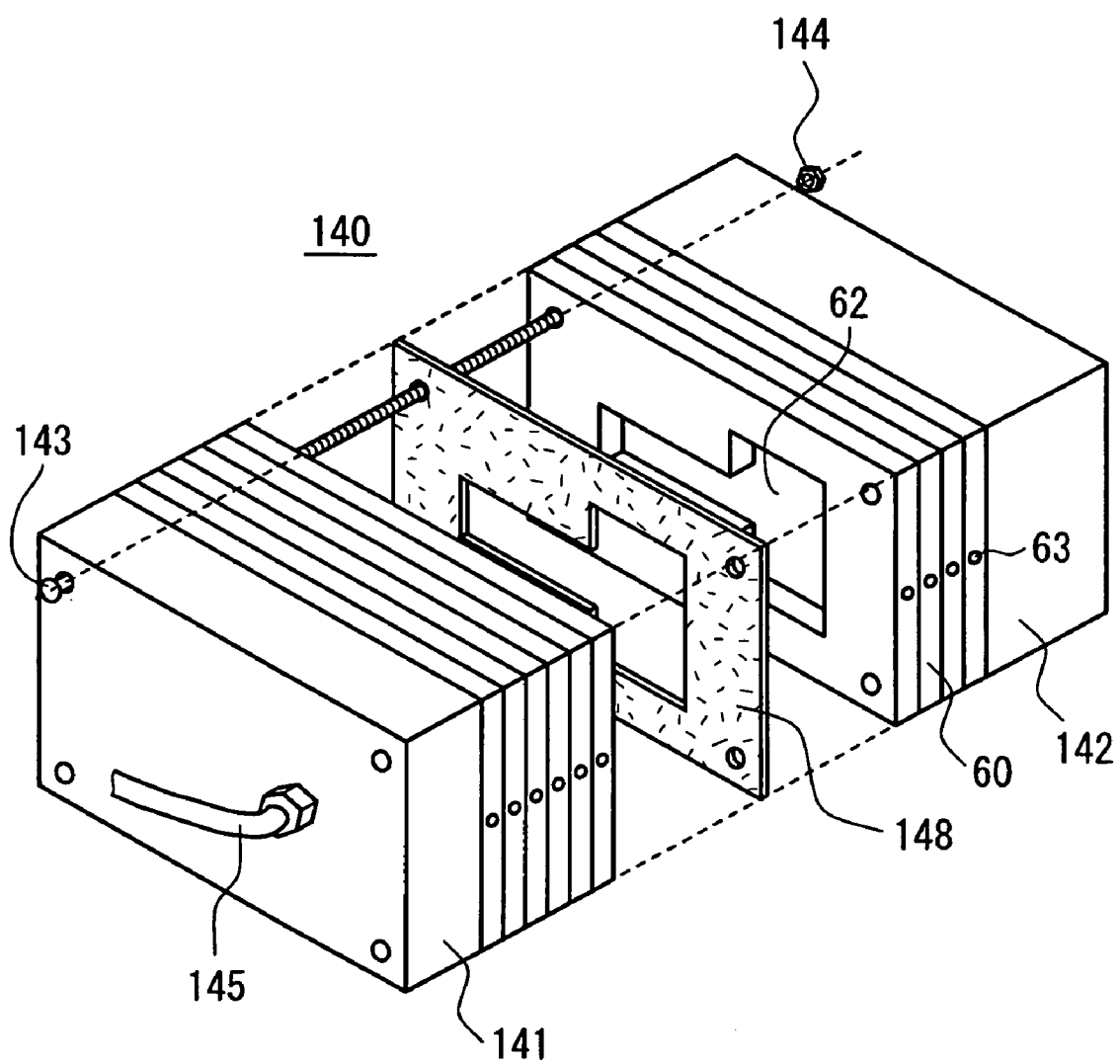
FIG. 9 is a schematic view of a multiple-type piezoelectric air valve according to the present invention to be used for a multi-channel sorting machine.

FIG. 9 is a partially-exploded perspective view of a multiple-type piezoelectric air valve 140 configured by transversely piling or stacking a plurality of unit air valves according to the above-described examples 1 to 4 including the variation so that it can meet with requirements to be used for a multi-channel sorting machine. Although it is configured such that ten unit air valves are jointed in series in the drawing, it is needless to say that the number of the air valves may be altered freely in accordance with the intended applications. Note that the drawing of the inside of the unit air valve is omitted here. To one side of each of the outermost air valves when a plurality of unit air valves are piled, side plates 141, 142 for defining a common compressed air chamber 62 inside are attached. The plurality of unit air valves are fastened with the side plates 141 and 142, and all of the air valves are fixed with plural fastenings (e.g., bolts 143 and nuts 144) each of those which penetrates through all of the air valves to connect them so that a multiple-type piezoelectric air valve is configured. The compressed air fed from the air pressure supply source (not shown) is introduced from either right or left side plate 141, 142 into the common compressed air chamber 62 being defined between the side plates 141, 142 via a pipe 145. Note that gaskets 148 are set between the unit air valves, and between the outermost air valve and the side plate, respectively, in order to prevent air leakage from the piled plural unit air valves. It is needless to say that the respective piezoelectric air valves can be operated independently one another when a voltage is selectively applied to the piezoelectric elements included in the respective air valves.

As described above, in the piezoelectric air valve according to this invention, a gap with a sufficient dimension is produced between the valve body and the valve seat while the voltage is applied to the piezoelectric element, since the displacements generated by the piezoelectric element are enlarged by the displacement enlarging mechanism and then transmitted to the valve body for controlling the opening/closing of the space between the compressed air chamber and the air outlet. As a result, compressed air of sufficient volumes may be ejected in the form of air pulses from the compressed air chamber to the exterior through the air outlet. Moreover, since all of the components in a region from the piezoelectric element to the valve body are jointed to one another, the resetting force of the piezoelectric element is forcibly transmitted to the valve body when the voltage applying to the piezoelectric element is stopped. As a result, the quick operations to open and close the space between the compressed air chamber and the air outlet can be realized.

Furthermore, since the piezoelectric element itself can exert very high conversion efficiency, it is possible to provide an air valve consuming less electric power with use of the piezoelectric element.

Still further, since the physical dimension of the piezoelectric element itself is little, it is made easy to make the size of the unit air valve compact. Hence, where a plurality of unit air valves are jointed to form a multiple-type piezoelectric air valve to be used for a multi-channel sorting machine, it is unnecessary to provide special arrangements, such as arrangement of plural unit air valves in zigzag patterns, and it may be sufficient to simply pile the unit air valves of the required pieces.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. A piezoelectric air valve to be used for a granular material sorting machine comprising:

an air valve main body including an air pressure chamber for receiving compressed air fed from an air pressure feeding means and an air outlet extending from the air pressure chamber to an exterior;

a valve body for controlling operations to open and close a space between the air pressure chamber and the air outlet;

a piezoelectric element for generating driving force required for the operations to open and close the valve body in the form of displacements;

a pair of displacement enlarging mechanisms arranged symmetrically with respect to the air outlet as upper and lower displacement enlarging mechanisms, each displacement enlarging mechanism enlarges the displacements generated by the piezoelectric element and then applies the enlarged displacements to the valve body; and wherein the valve body, each displacement enlarging mechanism and the piezoelectric element are mechanically connected to one another, and on one hand, the operation to open the valve body is performed in accordance with the displacements generated by the piezoelectric element and subsequently enlarged by the displacement enlarging mechanism when a voltage is applied to the piezoelectric element and, on the other hand, the operation to close the valve body is performed in accordance with resetting force of the piezoelectric element when the voltage applied to the piezoelectric element is stopped; and wherein the upper displacement enlarging mechanism comprises:

a first hinge member, one end of which is jointed to the air valve main body and operates as the fulcrum;

a second hinge member, one end of which is jointed to the piezoelectric element in a substantially parallel relation with respect to the first hinge member and operates as the point of power;

a first arm member to which the respective other ends of the first and second hinge members are jointed, the first arm member extending a distance longer than the distance between the first hinge member and the second hinge member, and the tip portion of which operates as the point of action;

a first spring member, one end of which is jointed to the tip portion of the first arm member and the other end of which is jointed to a first part of the valve body; and wherein the lower displacement enlarging mechanism comprises:

a third hinge member, one end of which is jointed to the air valve main body and operates as the fulcrum;

a fourth hinge member, one end of which is jointed to the piezoelectric element in a substantially parallel relation with respect to the third hinge member and operates as the point of power;

a second arm member to which the respective other ends of the third and fourth hinge members are jointed, the second arm member extending a distance longer than the distance between the third hinge member and the fourth hinge member, and the tip portion of which operates as the point of action; and a second spring member, one end of which is jointed to the tip portion of the second arm member and the other end of which is jointed to a second part of the valve body.

2. The piezoelectric air valve according to claim 1, wherein the displacements generated by the piezoelectric element are enlarged L2/L1 times at the each point of action by virtue of the principle of a pry, where a distance between each fulcrum and each point of power is given as L1 and a distance between each fulcrum and each point of action is given as L2 (L1<L2).

3. The piezoelectric air valve according to claim 2, wherein at least one of the first and second arm members include the valve body at its tip portion in a unified state.

4. The piezoelectric air valve according to claim 2, wherein the second hinge member is connected to the piezoelectric element via a cap member.

5. The piezoelectric air valve according to claim 1, wherein a valve seat is provided between the air outlet and the valve body.

6. The piezoelectric air valve according to claim 1, wherein the piezoelectric element, each displacement enlarging mechanism and the valve body are provided in the form of a unified unit onto a base plate separated from the air valve main body, and the unit is installed in a unit installation region in the air valve main body.

7. A piezoelectric air valve to be used for a granular material sorting machine comprising:
an air valve main body including an air pressure chamber for receiving compressed air fed from an air pressure feeding means and an air outlet extending from the air pressure chamber to an exterior;
a valve body for controlling operations to open and close a space between the air pressure chamber and the air outlet;
a piezoelectric element for generating driving force required for the operations to open and close the valve body in the form of displacements;
a pair of displacement enlarging mechanisms arranged symmetrically with respect to the air outlet as upper and lower displacement enlarging mechanisms, each displacement enlarging mechanism enlarges the displacements generated by the piezoelectric element and then applies the enlarged displacements to the valve body;
wherein the valve body, the displacement enlarging mechanism and the piezoelectric element are mechanically connected to one another, and on one hand, the operation to open the valve body is performed in accordance with the displacements generated by the piezoelectric element and subsequently enlarged by the displacement enlarging mechanism when a voltage is applied to the piezoelectric element and, on the other hand, the operation to close the valve body is performed in accordance with resetting force of the piezoelectric element when the voltage applied to the piezoelectric element is stopped;
wherein each displacement enlarging mechanism comprises a hinge and an arm member, the hinge is mechanically connected between the piezoelectric element and the arm member, the arm member is mechanically connected to the valve body; and
wherein the mechanical connection between the arm member and the valve body comprises a spring.

8. The piezoelectric air valve according to claim 7, wherein each of the pair of the displacement enlarging mechanisms comprises:
a first hinge member, one end of which is jointed to the air valve main body;
a second hinge member which is substantially parallel with respect to the first hinge member, and one end of which is jointed to the piezoelectric element;
an arm member to which the respective other ends of the first and second hinge members are jointed and extending a distance longer than a distance between the first hinge member and the second hinge member, and
wherein the first hinge member, the second hinge member and the arm member act as the fulcrum, the point of power and the point of action, respectively, and the displacements generated by the piezoelectric element are enlarged L2/L1 times at the point of action by virtue of the principle of a pry, where a distance between the fulcrum and the point of power is given as L1 and a distance between the fulcrum and the point of action is given as L2(L1<L2).

9. The piezoelectric air valve according to claim 8, wherein the second hinge member is connected to the piezoelectric element via a cap member.

10. The piezoelectric air valve according to claim 7, wherein a valve seat is provided between the air outlet and the valve body.

11. The piezoelectric air valve according to claim 7, wherein the piezoelectric element, each displacement enlarging mechanism and the valve body are provided in the form of a unified unit onto a base plate separated from the air valve main body, and the unit is installed in a unit installation region in the air valve main body.

12. A piezoelectric air valve to be used for a granular material sorting machine comprising:
an air valve main body including an air pressure chamber for receiving compressed air fed from an air pressure feeding means and an air outlet extending from the air pressure chamber to an exterior;
a valve body for controlling operations to open and close a space between the air pressure chamber and the air outlet;
a piezoelectric element for generating driving force required for the operations to open and close the valve body in the form of displacements;
a pair of displacement enlarging mechanisms arranged symmetrically with respect to the air outlet as upper and lower displacement enlarging mechanisms, each displacement enlarging mechanism enlarges the displacements generated by the piezoelectric element and then applies the enlarged displacements to the valve body;
wherein the valve body, the displacement enlarging mechanism and the piezoelectric element are mechanically connected to one another, and on one hand, the operation to open the valve body is performed in accordance with the displacements generated by the piezoelectric element and subsequently enlarged by the displacement enlarging mechanism when a voltage is applied to the piezoelectric element and, on the other hand, the operation to close the valve body is performed in accordance with resetting force of the piezoelectric element when the voltage applied to the piezoelectric element is stopped;
wherein each displacement enlarging mechanism comprises a hinge and an arm member, the hinge is mechanically connected between the air valve main body and the arm member, the arm member is mechanically connected to the valve body; and
wherein the mechanical connection between the arm member and the valve body comprises a spring.

13. The piezoelectric air valve according to claim 12, wherein each of the pair of the displacement enlarging mechanisms comprises:

a first hinge member, one end of which is jointed to the air valve main body;

a second hinge member which is substantially parallel with respect to the first hinge member, and one end of which is jointed to the piezoelectric element;

an arm member to which the respective other ends of the first and second hinge members are jointed and extending a distance longer than a distance between the first hinge member and the second hinge member, and wherein the first hinge member, the second hinge member and the arm member act as the fulcrum, the point of power and the point of action, respectively, and the displacements generated by the piezoelectric element are enlarged L2/L1 times at the point of action by virtue of the principle of a pry, where a distance between the fulcrum and the point of power is given as L1 and a distance between the fulcrum and the point of action is given as L2(L1<L2).

14. The piezoelectric air valve according to claim 13, wherein the second hinge member is connected to the piezoelectric element via a cap member.

15. The piezoelectric air valve according to claim 12, wherein a valve seat is provided between the air outlet and the valve body.

16. The piezoelectric air valve according to claim 12, wherein the piezoelectric element, each displacement enlarging mechanism and the valve body are provided in the form of a unified unit onto a base plate separated from the air valve main body, and the unit is installed in a unit installation region in the air valve main body.

* * * * *